US010253857B2

(12) United States Patent
LaForce (10) Patent No.: US 10,253,857 B2
(45) Date of Patent: Apr. 9, 2019

(54) MULTI-SPEED ELECTRIC TRANSAXLE UNIT WITH CO-AXIAL SHAFTS

(71) Applicant: Dana Heavy Vehicle Systems Group, LLC, Maumee, OH (US)

(72) Inventor: Nicholas W. LaForce, Whitehouse, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 123 days.

(21) Appl. No.: 15/421,124

(22) Filed: Jan. 31, 2017

(65) Prior Publication Data

US 2018/0216713 A1    Aug. 2, 2018

(51) Int. Cl.
*B60K 17/16* (2006.01)
*F16H 37/08* (2006.01)
(Continued)

(52) U.S. Cl.
CPC .......... *F16H 37/0813* (2013.01); *B60K 1/00* (2013.01); *B60K 7/0007* (2013.01); *B60K 17/02* (2013.01); *B60K 17/046* (2013.01); *B60K 17/08* (2013.01); *B60K 17/16* (2013.01); *F16H 3/00* (2013.01); *F16H 3/66* (2013.01); *F16H 15/503* (2013.01); *F16H 48/08* (2013.01); *F16H 61/30* (2013.01); *B60K 2001/001* (2013.01); *B60K 2007/0092* (2013.01); *B60Y 2400/424* (2013.01); *B60Y 2400/72* (2013.01); *B60Y 2400/73* (2013.01); *F16H 37/082* (2013.01); *F16H 2048/364* (2013.01); *F16H 2048/368* (2013.01); *F16H 2200/0034* (2013.01);
(Continued)

(58) Field of Classification Search
CPC ......... F16H 2048/364; F16H 2048/368; F16H 2200/2035; F16H 2200/2097; F16H 2200/201; F16H 37/0813; F16H 3/66; F16H 48/08; B60K 7/0007; B60K 17/16; B60K 17/08; B60K 17/046; B60K 2007/0092; B60K 2001/001
USPC ............................. 475/5, 151, 203, 205, 290
See application file for complete search history.

(56) References Cited

U.S. PATENT DOCUMENTS 5,226,862 A * 7/1993 Hattori ................... F16H 3/666
475/286
7,867,125 B2 * 1/2011 Kim ........................ B60K 6/36
475/150
(Continued)

FOREIGN PATENT DOCUMENTS

AU    2011224083 A1    10/2011

*Primary Examiner* — Roger L Pang
(74) *Attorney, Agent, or Firm* — Marshall & Melhorn, LLC (57) ABSTRACT

A multi-speed transmission including an electric motor having a hollow rotor shaft disposed in an axle housing, a first planetary gear set, a second a planetary gear set, a third planetary gear set. The first planetary gear set is drivingly connected to the rotor shaft and a first transfer shaft. The second planetary gear set is drivingly connected to the first transfer shaft and a second transfer shaft and has ring gear selectively fixed to the axle housing. The third planetary gear set is drivingly connected to the first transfer shaft and an output gear and has a ring gear rotationally fixed to the axle housing. Clutches are selectively engaged to rotationally fix the ring gears to the axle housing. The rotor shaft and first transfer shaft are coaxially with respect to each other and axle half shafts of a transaxle.

8 Claims, 5 Drawing Sheets

(51) Int. Cl.
*F16H 3/66* (2006.01)
*F16H 15/50* (2006.01)
*F16H 48/08* (2006.01)
*F16H 61/30* (2006.01)
*B60K 1/00* (2006.01)
*B60K 7/00* (2006.01)
*B60K 17/04* (2006.01)
*B60K 17/08* (2006.01)
*B60K 17/02* (2006.01)
*F16H 3/00* (2006.01)
*F16H 48/36* (2012.01)

(52) U.S. Cl.
CPC ............... *F16H 2200/201* (2013.01); *F16H 2200/2035* (2013.01); *F16H 2200/2038* (2013.01); *F16H 2200/2097* (2013.01)

(56) References Cited

U.S. PATENT DOCUMENTS

| | | |
|---|---|---|
| 8,517,882 B2 | 8/2013 | Wenthen |
| 8,556,760 B2 | 10/2013 | Mack et al. |
| 9,073,538 B2 | 7/2015 | Mack et al. |
| 9,139,079 B2 | 9/2015 | Suntharalingam et al. |
| 9,205,735 B2 | 12/2015 | Imai et al. |
| 9,234,565 B2 | 1/2016 | Zhang et al. |
| 9,302,580 B2 * | 4/2016 | Smetana ............... F16H 48/36 |
| 9,303,745 B2 | 4/2016 | Wenthen et al. |
| 9,421,855 B2 | 8/2016 | Suntharalingam et al. |
| 9,453,564 B1 | 9/2016 | Pritchard et al. |
| 2006/0084549 A1 | 4/2006 | Smithson et al. |
| 2015/0273998 A1 | 10/2015 | Kiyokami et al. |
| 2016/0208897 A1 | 7/2016 | Wenthen et al. |

* cited by examiner

MULTI-SPEED ELECTRIC TRANSAXLE UNIT WITH CO-AXIAL SHAFTS

FIELD

The present disclosure relates to electric transaxle unit for motor vehicles. More particularly, a multi-speed electric transaxle unit for electric and hybrid vehicles.

BACKGROUND

The use of internal combustion engines (hereinafter abbreviated as ICE) has dominated the automotive industry over the last century. However, environmental concerns, dependence on oil, restrictions enforced by governments, and an enormous demand for improved fuel economy has encouraged automotive manufacturers to develop more fuel-efficient and environmentally friendly solutions. Alternative powertrains, meaning that alternative power sources to the ICE are employed to propel a vehicle driveline, is one of the common solutions in the industry. Alternative powertrains typically include turbochargers, fuel cell systems, electric vehicles, hybrid electric vehicles, plug-in electric hybrids, hydraulic hybrids, mechanical hybrids, among others.

Conventionally, a hybrid electric vehicles includes an ICE and an electric motor that can be used together or independently to drive the vehicle. Differentials are well known in the prior art and are arranged in a power transmission system of a motor vehicle to allow a pair of output axle shafts operatively coupled to an input shaft to rotate at differential speeds, thereby allowing the wheel associated with each output shaft to maintain traction with the road while the vehicle is turning.

Current electric and hybrid electric vehicles typically utilize a countershaft design. The countershaft design includes the use of at least one countershaft with a combination of helical and planetary gear arrangements drivingly connected thereto in addition to the axle having a differential assembly to provide a multi-speed transmission. These arrangements require specialized packaging and additional components that increase the cost of the vehicle.

Therefore, there is a need for a simplified transaxle arrangement reducing cost and eliminating clearance problems caused by a countershaft interfering with other vehicle components such as, but not limited to a sub frame, interior space, fuel cell, or battery packs.

SUMMARY

Provided herein is a multi-speed transmission including an electric motor having a hollow rotor shaft disposed in an axle housing, a first planetary gear set, a second planetary gear set and a third planetary gear set. The first planetary gear set includes a sun gear drivingly connected to the rotor shaft, a ring gear rotationally fixed to the axle housing, a planet gear drivingly engaged to the sun gear and ring gear and a planet carrier drivingly connected to a first transfer shaft and supporting the planet gear. The second planetary gear set includes a sun gear drivingly connected to the first transfer shaft, a ring gear selectively fixed to the axle housing a planet gear drivingly engaged to the sun gear and ring gear and a planet carrier supporting the planet gear. The third planetary gear set includes a sun gear rotatably drivingly connected to the first transfer shaft, a ring gear selectively fixed to the axle housing and drivingly connected to the planet carrier of the second planetary gear set, a planet gear drivingly engaged to the sun gear and ring gear, and a planet carrier drivingly connected to an output gear. The transmission further includes a first clutch selectively engaged to rotationally fix the ring gear of the second planetary gear set and a second clutch selectively engaged to rotationally fix the ring gear of the third planetary gear set. The rotor shaft and first transfer shaft are coaxially with respect to each other.

Provided herein is a multi-speed transmission including an electric motor having a hollow rotor shaft, a continuously variable planetary transmission (CVP), a first planetary gear set and a second planetary gear set. The CVP includes a first ring assembly coupled to the rotor shaft, a carrier assembly having a plurality of tiltable variator balls drivingly engaged with the first ring assembly, and a second ring assembly drivingly engaged with the tiltable variator balls and a first transfer shaft. The first planetary gear set includes a sun gear drivingly connected to the transfer shaft, a ring gear selectively fixed to the axle housing, a planet gear drivingly engaged t the sun gear and ring gear and a planet carrier supporting the planet gear. The second planetary gear set includes a sun gear drivingly connected to the first transfer shaft, a ring gear selectively fixed to the axle housing and drivingly engaged with the planet carrier of the first planetary gear set, a planet gear drivingly engaged to the sun gear and ring gear, and a planet carrier drivingly connected to an output gear. The transmission further includes a first clutch selectively engaged to rotationally fix the ring gear of the first planetary gear set and a second clutch selectively engaged to rotationally fix the ring gear of the second planetary gear set. The rotor shaft and first transfer shaft are coaxially with respect to each other.

DESCRIPTION OF PREFERRED EMBODIMENTS

It is to be understood that the preferred embodiments may assume various alternative orientations and step sequences, except where expressly specified to the contrary. It is also to be understood that the specific assemblies, articles and features illustrated in the attached drawings, and described in the following specification are simply exemplary embodiments of the inventive concepts defined the appended claims. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

Figure 1:
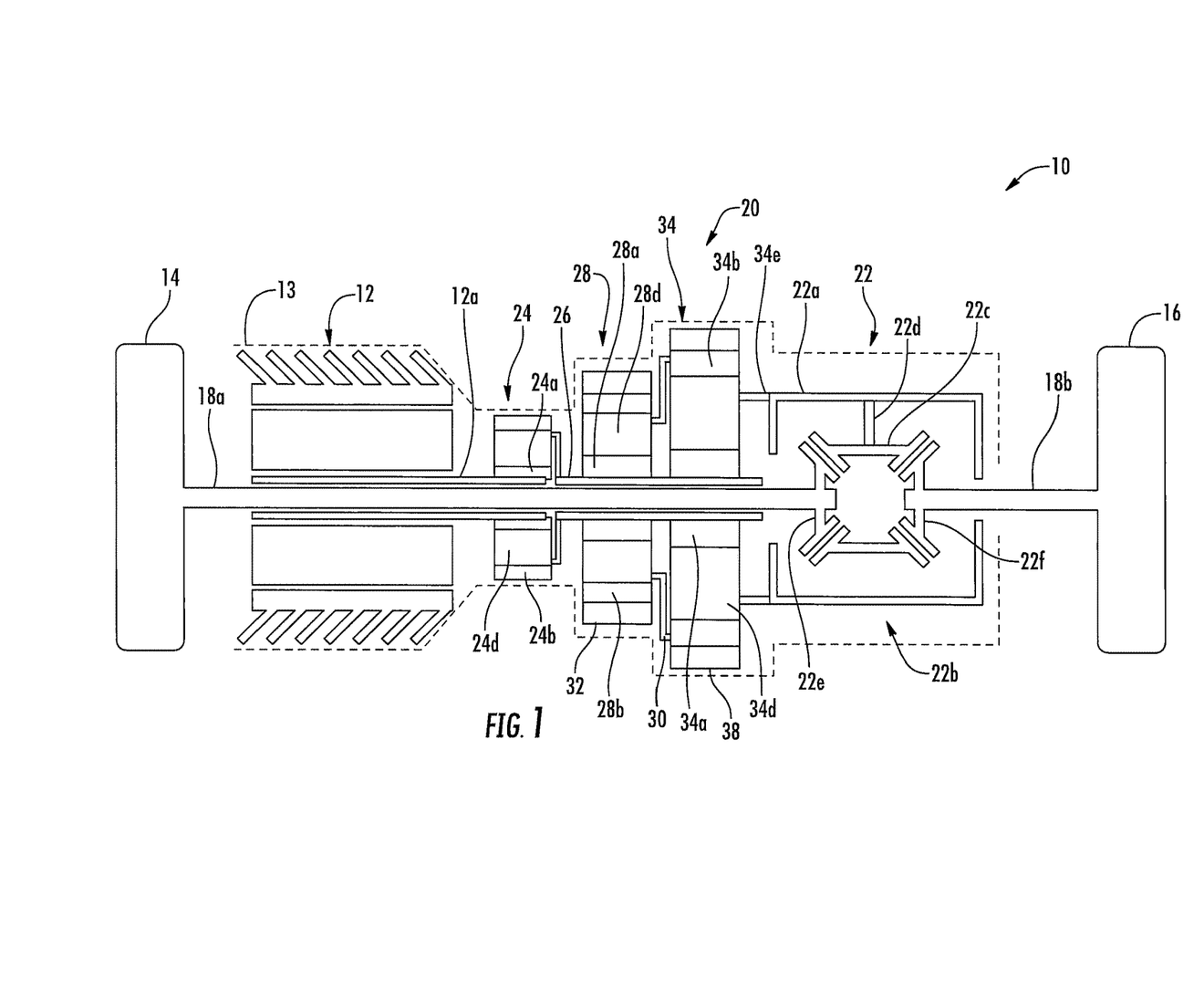
FIG. 1 is a schematic view of a preferred embodiment of an electric transaxle unit.

Referring now to FIG. 1, an electric transaxle unit 10 depicted. The electric transaxle unit 10 includes an electric motor 12 which acts as an electro-mechanical energy converter for converting electricity to mechanical power. In one embodiment, the electric motor 12 is a hollow rotor electric motor having a hollow rotor shaft 12a extending therefrom. Rotor shaft 12a defines a central axis A.

The electric motor 12 is energized by electricity and outputs rotational movement and torque. Optionally, the electric motor 12 may additionally act as an electric generator during brake operation of the electric vehicle for converting braking force into electricity which may be fed back to a battery pack. The electric motor 12 is preferably fixed to and housed by an axle housing 13.

Although, the transaxle unit 10 is discussed as being implement in a motor vehicle having an electric motor 12, it is also applicable in other vehicles or equipment which have any type of prime movers that output rotational movements.

A pair of wheels 14, 16 is drivingly connected on one end of axle half shafts 18a, 18b respectively. The axle half shafts 18a, 18b form an axle of a motor vehicle. The rotor shaft 12a of the electric motor 12 is coaxial with to the axle half shaft 18a. It can be appreciated that the pair of wheels 14, 16 form a pair of driving wheels for the motor vehicle. The vehicle may have a pair of front driving wheels, a pair of back driving wheels, or two pairs of front and back driving wheels.

In one embodiment, a transmission 20 is disposed axially between the motor 12 and one wheel 16 on the axle shaft 18a. A differential assembly 22 is disposed between the transmission 20 and the wheel 16.

The differential assembly 22 includes a differential case 22a and a differential gear arrangement 22b disposed in the differential case 22a with the two axle half shafts 18a, 18b extending in axially opposites directions therefrom. The differential gear arrangement 22b is drivingly connected to the axle half shafts 18a, 18b respectively. In turn, the axle half shafts 18a, 18b are drivingly coupled to wheels 14, 16 via suitable coupling means. In one embodiment, the differential gear arrangement 22b includes a set of pinion gears 22c rotatably supported on a pinion shaft 22d secured to the differential case 22a. The pinion gears 22c engage a pair of opposite side gears 22e, 22f adapted to rotate about the axis defined by the axle half shafts 18a, 18b. The side gears 22e, 22f are splined to the axle half shafts 18a, 18b respectively. The side gears 22e, 22f have central axes co-linear with each other and perpendicular to the axis of the pinion gears 22c.

The differential assembly 22 distributes rotational movement to the pair of wheels 14, 16 via the differential case 22a and the differential gear arrangement 22b. The side gears 22e, 22f with respect to the differential case 22a in opposite directions allowing the two wheels 14, 16 to rotate at different speeds.

In one embodiment, the transmission 20 includes a first planetary gear set 24 including a sun gear 24a, a ring gear 24b and at least one planet gear 24c which is meshingly engaged with the sun gear 24a and the ring gear 24b. The planet gear 24c is disposed on a planet carrier 24d which is rotatable around the same axis as the sun gear 24a and is drivingly connected to a transfer shaft 26. The sun gear 24a is splined to the rotor shaft 12a. The axle half shafts 18a, 18b defines the central axis of the sun gear 24a and is connected with the sun gear 24a. Transfer shaft 26 extends coaxially around a portion of the axle half shaft 18a and is drivingly connected with the planet carrier 24d, for example, by splining. Transfer shaft 26 is preferably a hollow shaft that is coaxial with the rotor shaft 12a. The ring gear 24b is rotationally fixed to the axle housing 13.

Further, the transmission 20 includes a second planetary gear set 28 including a sun gear 28a, a ring gear 28b and at least one planet gear 28c which is meshingly engaged with the sun gear 28a and the ring gear 28b. The planet gear 28c is disposed on a planet carrier 28d which is rotatable around the same axis as the sun gear 28a and is attached to a transfer shaft 30. The sun gear 28a is drivingly engaged with transfer shaft 26, for example, by splines. Transfer shaft 30 is preferably a hollow shaft that is coaxial with the rotor shaft 12a. The ring gear 28b is in selective engagement with the axle housing 13 using a first clutch 32. In one embodiment, the clutch 32 is a hydraulic friction clutch pack.

Further, the transmission 20 includes a third planetary gear set 34 including a sun gear 34a, a ring gear 34b and at least one planet gear 34c which is meshingly engaged with the sun gear 34a and the ring gear 34b. The planet gear 34c is disposed on a planet carrier 34d which is rotatable around the same axis as the sun gear 34a and is drivingly attached to the differential case 22a via the planet carrier 34d. Further, the planet gear 34c is drivingly connected to transfer shaft 30. The sun gear 34a is splined to the transfer shaft 26. Shaft 36 is preferably a hollow shaft that is coaxial with the rotor shaft 12a. The ring gear 34b is in selective engagement with the axle housing 13 using a second clutch 38. In one embodiment, the clutch 38 is a hydraulic friction clutch pack. Additionally, the ring gear 34b is phase locked with the planet gear 28c via transfer shaft 30.

In some embodiments, the first and second clutches 32, 38 include clutch discs and clutch plates which are alternately disposed together with a clutch spring and a clutch piston within a clutch housing. The number of clutch plates and discs can vary. If a pressure equal to or greater than a predetermined specified pressure is applied to the clutch piston to which power is being applied, the alternately arranged clutch discs and clutch plates are pressed against one another to engage the clutch. If the hydraulic pressure applied to the friction clutch decreases below the predetermined pressured, the friction clutch discs and plates slide and if the applied hydraulic pressure further decreases, the friction clutch is disengaged. The hydraulic friction clutches 32, 38 can be switched between engaged and disengaged conditions, smoothly and swiftly, thus providing smooth gear changes.

The clutches 32, 38 can be actuated by any suitable actuator (not shown). It is appreciated that the actuator may alternatively be an electric, electromagnetic, pneumatic or hydraulic motor, a solenoid or any other actuators that can output a linear or rotary movement.

It is further appreciated that the hydraulic friction clutches 32, 38 can be substituted by other forms of clutching elements.

Figure 2:
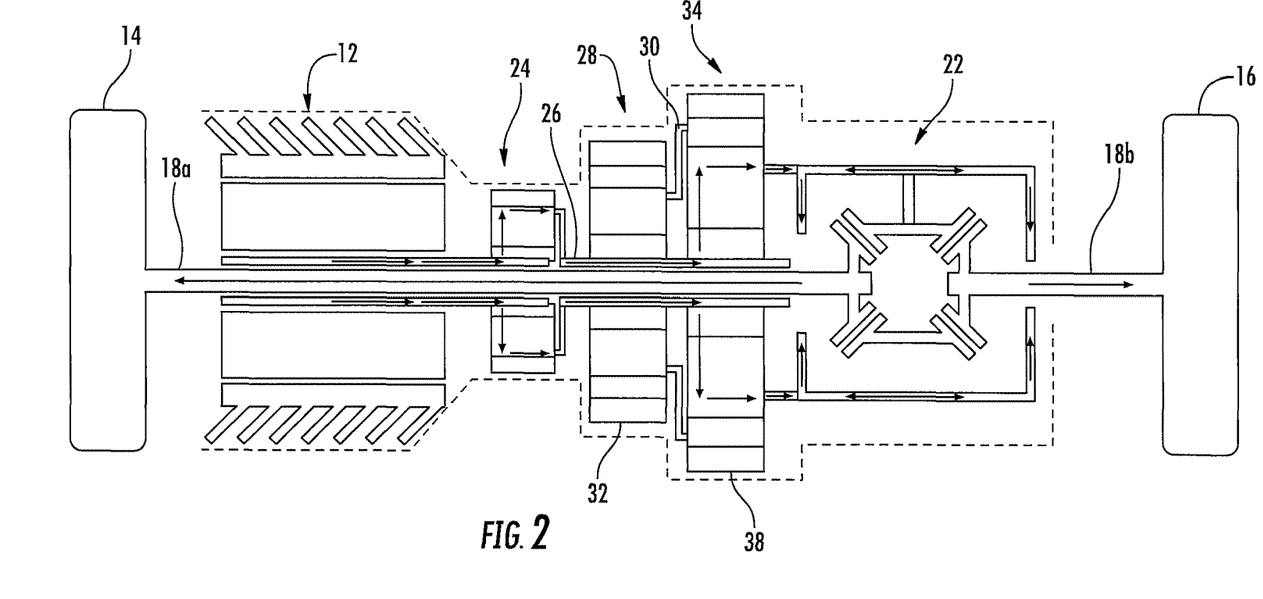
FIG. 2 is a schematic view depicting power flow through the electric transaxle unit of FIG. 1 at a first speed ratio.

The electric transaxle unit 10 provides multiple speeds of operation by selectively engaging and disengaging the clutches 32, 38. To operate at a first gear ratio, as depicted in FIG. 2, the rotation of the electric motor 12 is transmitted to the first sun gear 24a via the rotor shaft 12a and is transmitted through the planetary gearset 24 to the planet carrier 24d at fixed speed ratio. The rotation is then transferred through transfer shaft 26. The first clutch 32 is not engaged and the second ring gear 28b is not engaged with the axle housing 13 and the rotational movement is transmitted to the third planetary set 34 through the transfer shaft 26. The second clutch 38 is engaged connecting the third ring gear 34c with the axle housing 13 and the rotational energy is transmitted through the third sun gear 34a and third planet carrier 34d to the differential assembly 22 through the differential case 22a. Thus, the first speed ratio of the transmission is determined by the structure of the planetary gear set 24, in particular by the numbers of teeth of the sun gear 24a and the ring gear 24b. Any predetermined speed ratio can be selected by altering the number of teeth on the sun gear 24a and ring gear 24b. The first speed ratio is the maximum speed ratio provided by the transmission 20.

Figure 3:
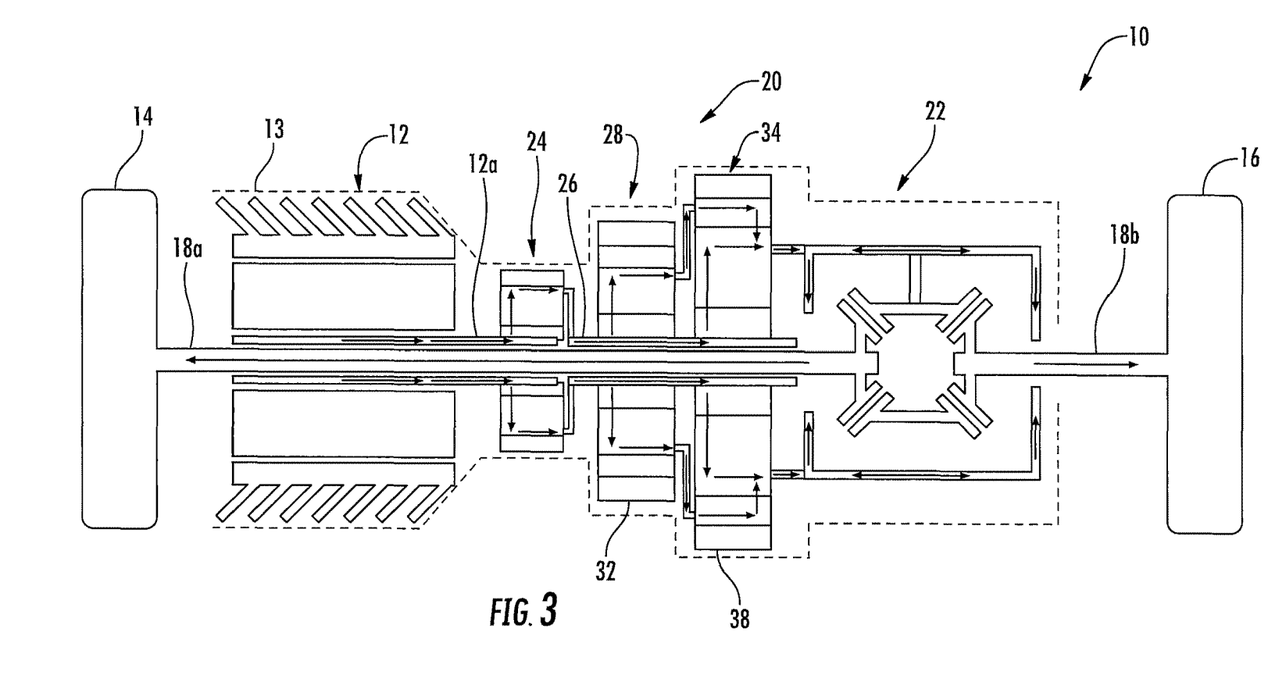
FIG. 3 is a schematic view depicting power flow through the electric transaxle unit of FIG. 1 at a second speed ratio.

To operate at a second speed ratio, as depicted in FIG. 3, the rotation of the electric motor 12 is transmitted to the first sun gear 24a via the rotor shaft 12a and through the planetary gearset 24 to the planet carrier 24d at fixed speed ratio. The rotational movement is then transferred through transfer shaft 26. The first clutch 32 is engaged and the second ring gear 28b is rotationally locked with the axle housing 13. The second planetary gear set 28 is drivingly connected to both the transfer shaft 26 and the third planetary gear set 34. The rotational energy is transferred to third planetary set 34 through the transfer shaft 26 and the sun gear 34a and additionally to the third ring gear 34c through the second sun gear 28a and the planet carrier 28d providing a second speed ratio. The second speed ratio is lower than the first speed ratio.

The third planet carrier 34d is drivingly connected to the differential assembly 22 through the output gear 34e and the differential case 22a. The differential gear arrangement 22b distributes rotational movement to the two wheels 14, 16 at different speeds.

A compact packaging for the electric transaxle unit 10 is provided by the coaxial arrangement of the electric motor 12, the transmission 20 with the transfer shaft 26 and the differential assembly 22 with the axle half shafts 18a, 18b in a single axle housing 13.

Figure 4:
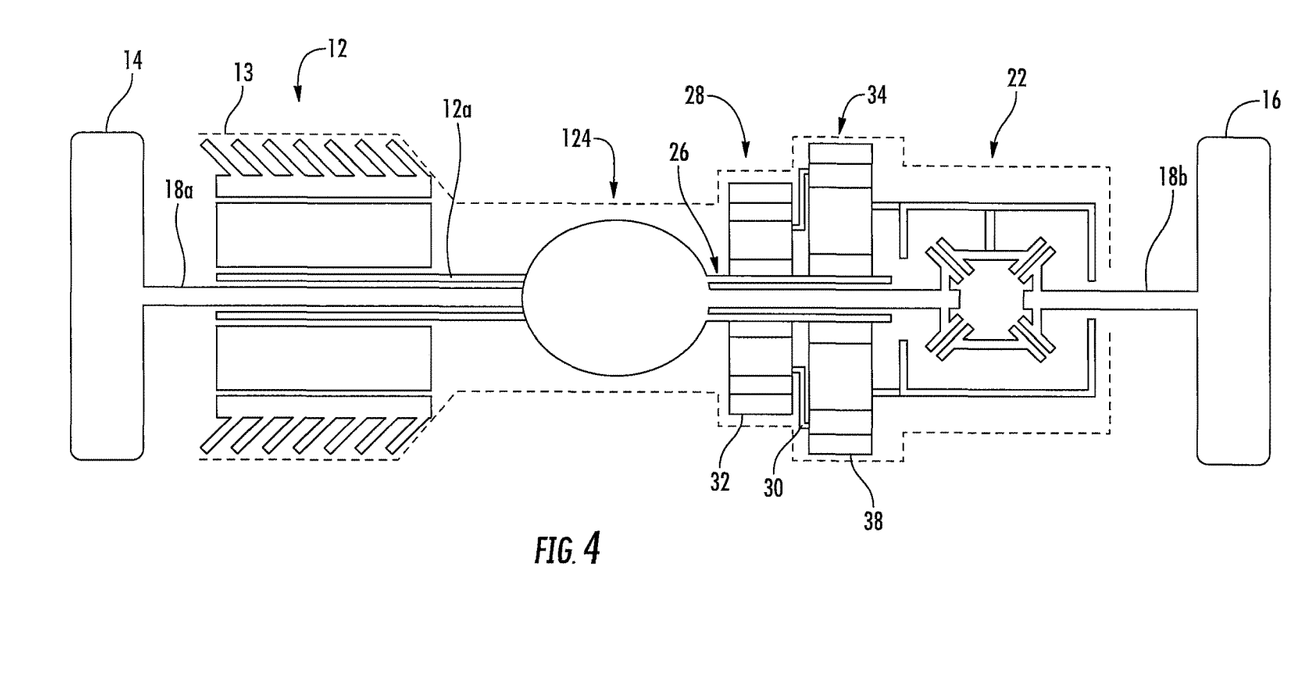
FIG. 4 is a schematic view of another preferred embodiment an electric transaxle unit.
Figure 5:
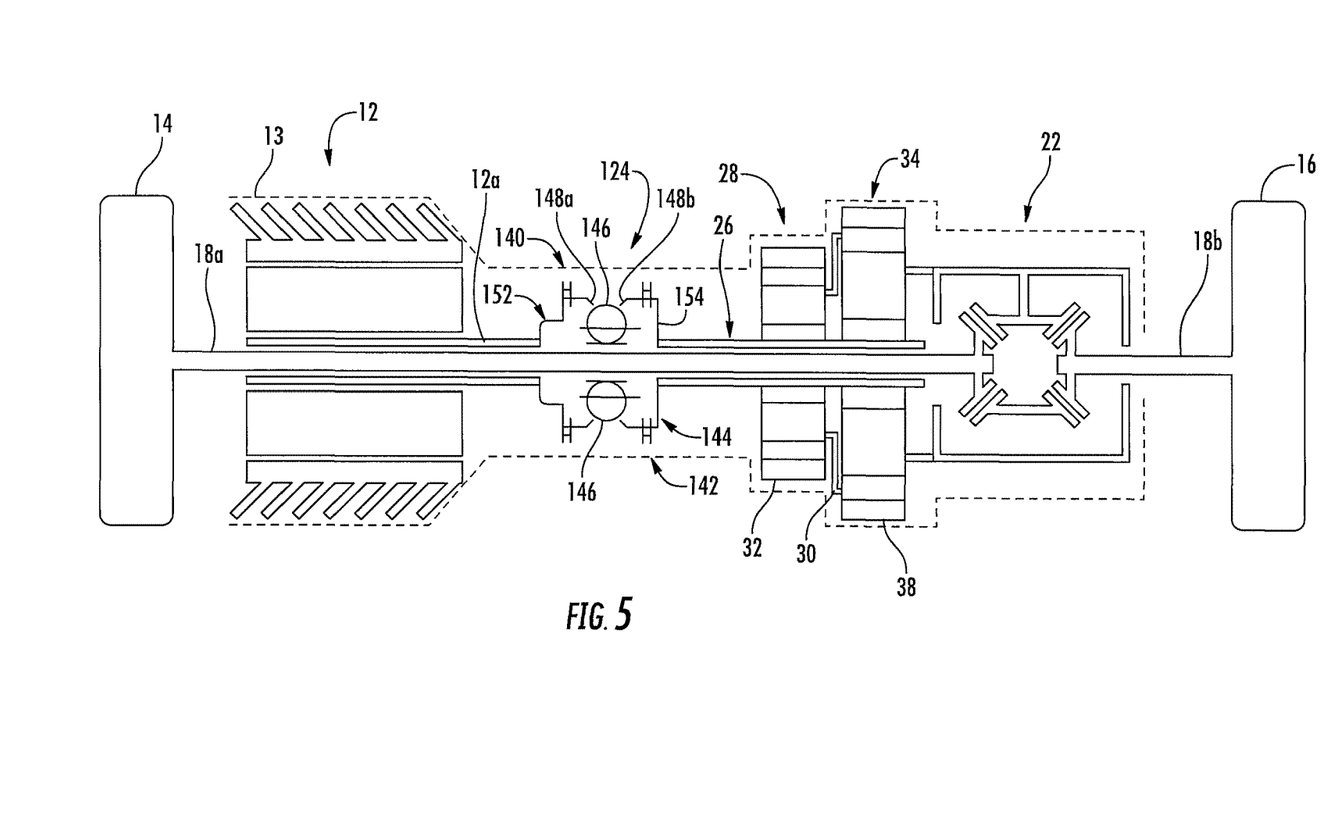
FIG. 5 is a schematic view of another preferred embodiment an electric transaxle unit.

In another embodiment, as depicted in FIG. 4, the first planetary gear set can be replaced with a continuously variable planetary (CVP) transmission 124. The CVP 124 can be as described in US 20060084549, incorporated herein by reference in its entirety. The CVP 124 as shown in FIGS. 4 and 5 includes a first ring assembly 140, a second ring assembly 142, and a carrier assembly 144 (also referred to as a "variator carrier assembly" or "variator carrier") disposed therebetween. The carrier assembly 144 typically includes a plurality of variator balls 146 having tiltable axle shafts as described herein. In some embodiments, the first ring assembly 140 includes a first variator ball engagement surface 148a that is in driving engagement with a plurality of variator balls of the carrier assembly 144. In some embodiments the first ring assembly 140 may be drivingly engaged with an input shaft 152. The second ring assembly 142 includes a second variator ball engagement surface 148b that is in driving engagement with variator balls 146 of the carrier assembly 144. The second ring assembly 142 is drivingly engaged with an output shaft 154.

In this embodiment, rotational movement is transferred from the electric motor 12 to input shaft 152 of the CVP 124 via the rotor shaft 12a. The output shaft 154 of the CVP 124 is drivingly connected to the transfer shaft 26. The CVP 124 provides a multi-speed transmission 20 that can change the speed ratio from the minimum to the maximum ratio without any interruption of the power transmission. The transfer shaft 26 extends coaxially around a portion of the axle half shaft 18a and is drivingly connected with the output shaft 154 of the CVP, for example, by splining. Transfer shaft 26 is preferably a hollow shaft that is coaxial with the rotor shaft 12a. The transfer shaft 26 transfers rotational movement to the second and third planetary gear sets 28, 34 and the first and second clutches 32, 38 selectively engage the axle housing 13 to change the speed ratio as discussed above.

Rotational power is transmitted through the transmission 20 resulitng in no axial thrust on the system and requiring no additional axially loaded bearing supports.

The movement transmitted through the transmission 20 is reversible. Thus, during normal forward running of the vehicle, the electric motor 12 rotates normally. When the gearshift of the vehicle is put into a reverse location, the electric motor 12 will rotate reversely. As a result, the wheels 14, 16 are driven in a reverse direction.

In some embodiments, the operation of the electric motor 12 is controlled by a controller (not shown) connected thereto. The controller may be the vehicle ECU (electronic control unit), a sub-module in the vehicle ECU, an individual controller communicated with the vehicle ECU or the like. The controller can receive commands from the operator of the motor vehicle including information about operations to the gearshift, the acceleration pedal and other pedals as well as other related information, and then controls the electric motor 12 to rotate in a desired direction at a desired speed. Additionally the actuation of clutches 32, 38 are controlled by the ECU in response to the commands from the operator of the motor vehicle and vehicle running conditions according to at least one vehicle parameter, including but not limited to wheel speeds, etc.

During a shifting process, the ECU controls the electric motor 12 and the clutches 32, 38. The ECU receives a shifting command or determines to automatically initiate a speed ratio shifting, the ECU controls the torque of the electric motor 12. Additionally, the ECU selectively engages and disengages the clutches 32, 38 using the actuator to achieve the desired speed ratio.

It is to be understood that the above description is intended to be illustrative, and not limiting. Many embodiments will be apparent to those of skill in the art upon reading the above description. The scope of the embodiments should be determined, however, not with reference to the above description, but with reference to the appended claims and the full scope of equivalents to which the claims are entitled by law.

What is claimed is:

1. A multi-speed transmission, comprising:
    an electric motor having a hollow rotor shaft drivingly connected thereto and defining a central axis disposed inside an axle housing;
    a first planetary gear set including:
        a sun gear rotable around the central axis and drivingly connected to the rotor shaft;
        a ring gear rotationally fixed to the axle housing;
        a planet gear drivingly engaged to the sun gear and ring gear; and
        a planet carrier drivingly connected to a first transfer shaft and supporting the planet gear;
    a second planetary gear set including:
        a sun gear rotable around the central axis and drivingly connected to the first transfer shaft;
        a ring gear selectively fixed to the axle housing;
        a planet gear drivingly engaged to the sun gear and ring gear; and
        a planet carrier supporting the planet gear;
    a third planetary gear set including:
        a sun gear rotable around the central axis and drivingly connected to the first transfer shaft;
        a ring gear selectively fixed to the axle housing and drivingly connected to the planet carrier of the second planetary gear set;
        a planet gear drivingly engaged to the sun gear and ring gear; and a planet carrier drivingly connected to an output gear;

a first clutch selectively engaged to rotationally fix the ring gear of the second planetary gear set; and a second clutch selectively engaged to rotationally fix the ring gear of the third planetary gear set, wherein the rotor shaft and first transfer shaft are coaxial with respect to each other.

2. The multi-speed transmission of claim 1, wherein the transmission provides a first speed ratio when the second clutch is engaged and the first clutch is disengaged and a second speed ratio when the first clutch is engaged and the second clutch is disengaged.

3. The multi-speed transmission of claim 1, wherein the first clutch and second clutch are hydraulic friction clutches.

4. The multi-speed transmission of claim 1, wherein the first speed ratio is greater than the second speed ratio.

5. An electric transaxle unit comprising:

the multi-speed transmission of claim 1;

two axle half shafts extending through the axle housing; and a differential assembly including a differential gear arrangement drivingly connected to the two axle half shafts and a differential case housing the differential gear arrangement, wherein the electric motor, differential assembly, first planetary gear set, second planetary gear set and third planetary gear set are disposed inside the axle housing, and wherein the output gear of the third planetary gear set is connected to the differential case.

6. The electric transaxle unit of claim 5, wherein the two axle half shafts, rotor shaft and transfer shafts are coaxial with respect to each other.

7. The electric transaxle unit of claim 5, wherein the first clutch selectively fixes the ring gear of the secondary planetary gear set to the axle housing and wherein the second clutch selectively fixes the ring gear of the third planetary gear set to the axle housing.

8. The electric transaxle unit of claim 5, wherein the rotor shaft and one axle half shaft are coupled to each other by coaxial splines and wherein the first transfer shaft and one axle half shaft are coupled to each other by coaxial splines.

* * * * *